United States Patent
Hsiun

(10) Patent No.: US 7,095,341 B2
(45) Date of Patent: *Aug. 22, 2006

(54) PROGRAMMABLE VARIABLE-LENGTH DECODER

(75) Inventor: Vivian Hsiun, Yorba Linda, CA (US)

(73) Assignee: Broadcom Corporation, Irvine, CA (US)

(*) Notice: Subject to any disclaimer, the term of this patent is extended or adjusted under 35 U.S.C. 154(b) by 133 days.

This patent is subject to a terminal disclaimer.

(21) Appl. No.: 10/911,152

(22) Filed: Aug. 3, 2004

(65) Prior Publication Data

US 2005/0007264 A1    Jan. 13, 2005

Related U.S. Application Data

(63) Continuation of application No. 10/293,663, filed on Nov. 12, 2002, now Pat. No. 6,771,196, which is a continuation-in-part of application No. 09/640,870, filed on Aug. 18, 2000, now Pat. No. 6,768,774.

(60) Provisional application No. 60/170,866, filed on Dec. 14, 1999.

(51) Int. Cl.
   *H03M 7/40* (2006.01)
(52) U.S. Cl. .......................... 341/67; 341/65
(58) Field of Classification Search ........... 341/50–107
   See application file for complete search history.

(56) References Cited

U.S. PATENT DOCUMENTS

| 5,625,355 | A | * | 4/1997 | Takeno et al. ............... 341/67 |
| 5,696,507 | A | * | 12/1997 | Nam ............................ 341/67 |
| 6,069,575 | A | * | 5/2000 | Kinouchi et al. ............. 341/67 |
| 6,313,767 | B1 | * | 11/2001 | Ishizuka et al. .............. 341/67 |
| 6,587,057 | B1 | * | 7/2003 | Scheuermann ............... 341/67 |
| 6,771,196 | B1 | * | 8/2004 | Hsiun ........................ 341/106 |
| 2002/0154042 | A1 | * | 10/2002 | Igarashi et al. ............... 341/67 |

* cited by examiner

*Primary Examiner*—Linh Van Nguyen
(74) *Attorney, Agent, or Firm*—McAndrews, Held, & Malloy, Ltd.

(57) ABSTRACT

System and method for decoding variable-length codes. A variable-length decoder includes an address generator and a local memory unit. The local memory stores a variable-length code look-up table. The local memory can be programmed to include a look-up table supporting substantially any decoding algorithm. In one embodiment, a decoder memory unit and a system memory unit are employed together with the local memory to store a codeword look-up table. The shortest codes are stored in local memory, the next shortest in decoder memory, and the longest codes are stored in system memory. A multistage search algorithm is employed to search for the longest codes. The address generator generates the address of the code table to be searched by adding the value of the bits to be searched to a base address.

23 Claims, 6 Drawing Sheets

| Stage | D1 | D0 | Code Length | Accum. | Decoded Symbol |
|---|---|---|---|---|---|
| 1 | 00001010 0000110 00010 00011 0000101 | 0 010 0011 0000110 00010 00011 0000110 00 | 8 | 8 | I |
| 2 | 00001010 0000110 00010 00011 0000101 | 0 010 0011 0000110 00010 00011 0000110 00 | 7 | 15 | H |
| 3 | 00001010 0000110 00010 00011 0000101 | 0 010 0011 0000110 00010 00011 0000110 00 | 5 | 20 | F |
| 4 | 00001010 0000110 00010 00011 0000101 | 0 010 0011 0000110 00010 00011 0000110 00 | 5 | 25 | G |
| 5 | 00001010 0000110 00010 00011 0000101 | 0 010 0011 0000110 00010 00011 0000110 00 | 1 | 1 | — Cout=1 |
| 6 | 0 010 0011 0000110 00001010 000011000 | 10 00001010 0000110 00010 00011 00001 | 3 | 4 | B |
| 7 | 0 010 0011 0000110 00001010 000011000 | 10 00001010 0000110 00010 00011 00001 | 4 | 8 | E |

Transfer data from D0 to D1

Load New data to D0

FIG. 4

| Addr # ⌐600 | CCL ⌐610 | NSL ⌐620 | EOB ⌐630 | Status ⌐640 | INFO/OFFSET ⌐650 |
|---|---|---|---|---|---|
| 0 | 3 | 3 | 0 | 0101 | 8 (offset) |
| 1 | 0 | 0 | 0 | 0111 (error) | .... |
| 2 | 3 | - | 0 | 0100 (found) | B |
| 3 | 3 | - | 0 | 0100 (found) | C |
| 4 | 1 | - | 0 | 0100 (found) | A |
| 5 | 1 | - | 0 | 0100 (found) | A |
| 6 | 1 | - | 0 | 0100 (found) | A |
| 7 | 1 | - | 0 | 0100 (found) | A |
| .... | | | | | |
| 12 | 2 | - | 0 | 0100 (found) | X |
| 13 | 2 | - | 0 | 0100 (found) | X |
| 14 | 3 | - | 0 | 0100 (found) | Y |
| 15 | 3 | - | 0 | 0100 (found) | Z |

PROGRAMMABLE VARIABLE-LENGTH DECODER

PRIORITY CLAIM TO RELATED APPLICATIONS

The present application is a continuation of U.S. patent application Ser. No. 10/293,663, is now a U.S. Pat. No. 6,771,196, filed on Nov. 12, 2002 entitled "PROGRAMMABLE VARIABLE-LENGTH DECODER" which is continuation-in-part of U.S. patent application Ser. No. 09/640,870, is now a U.S. Pat. No. 6,768,774, entitled "VIDEO AND GRAPHICS SYSTEM WITH VIDEO SCALING," filed Aug. 18, 2000, which claims the benefit of the filing date of U.S. Provisional Patent Application No. 60/170,866, entitled "GRAPHICS CHIP ARCHITECTURE," filed Dec. 14, 1999, the contents of both of which are hereby expressly incorporated herein by reference. The present application also claims the benefit of the filing date of U.S. Provisional Patent Application No. 60/369, 014, entitled "PROGRAMMABLE VARIABLE LENGTH DECODER", filed on Apr. 1, 2002, the contents of which are hereby expressly incorporated herein by reference.

INCORPORATION BY REFERENCE OF RELATED APPLICATIONS

The following U.S. patent applications are related to the present application and are hereby specifically incorporated by reference: patent application Ser. No. 10/114,798, entitled "VIDEO DECODING SYSTEM SUPPORTING MULTIPLE STANDARDS"; patent application Ser. No. 10/114,679, entitled "METHOD OF OPERATING A VIDEO DECODING SYSTEM"; patent application Ser. No. 10/114,797, entitled "METHOD OF COMMUNICATING BETWEEN MODULES IN A DECODING SYSTEM"; patent application Ser. No. 10/114,886, entitled "MEMORY SYSTEM FOR VIDEO DECODING SYSTEM"; patent application Ser. No. 10/114,619, entitled "INVERSE DISCRETE COSINE TRANSFORM SUPPORTING MULTIPLE DECODING PROCESSES"; and patent application Ser. No. 10/113,094, entitled "RISC PROCESSOR SUPPORTING ONE OR MORE UNINTERRUPTIBLE CO-PROCESSORS"; all filed on Apr. 1, 2002. The following Provisional U.S. Patent Applications are also related to the present application and are hereby specifically incorporated by reference: Provisional Patent Application No. 60/369,144, entitled "VIDEO DECODING SYSTEM HAVING A PROGRAMMABLE VARIABLE LENGTH DECODER"; Provisional Patent Application No. 60/369, 210 entitled "DMA ENGINE HAVING MULTI-LEVEL COMMAND STRUCTURE"; and Provisional Patent Application No. 60/369,217, entitled "INVERSE QUANTIZER SUPPORTING MULTIPLE DECODING PROCESSES"; all filed on Apr. 1, 2002.

FIELD OF THE INVENTION

The present invention relates generally to video decoding systems, and, more particularly, to variable-length decoding.

BACKGROUND OF THE INVENTION

Generally, large amounts of data being compressed and decompressed for numerous reasons, including transmission, storage, retrieval, and processing use at some stage means of variable-length coding, such as Huffman coding.

Huffman coding was originally disclosed by D. A. Huffman in an article "A Method for the Construction of Minimum Redundancy Codes" Proc. IRE, 40: 1098, 1952. Huffman coding is a widely used technique for lossless data compression that achieves compact data representation by taking advantage of the statistical characteristics of the source. The Huffman code is a prefix-free variable-length code that assures that a code is uniquely decodable. In Huffman code, no codeword is the prefix of any other codeword. The run-length processed data are often subsequently coded by variable-length coding for further data compression.

Variable-length encoding allocates codes of different lengths to different input data according to the probability of occurrence of the input data, so that statistically, more frequent input codes are allocated shorter codes than the less frequent codes. The less frequent input codes are allocated longer codes. The allocation of codes may be done either statically or adaptively. For the static case, the same output code is provided for a given input datum, no matter what block of data is being processed. For the adaptive case, output codes are assigned to input data based on a statistical analysis of a particular input block or set of blocks of data, and possibly changes from block to block (or from a set of blocks to a set of blocks).

The combination of run-length coding and Huffman coding has been adopted in most compression/decompression standards. However, every standard has its own Huffman tables and run-length definitions. In principle, a programmable decoding table could be implemented by a random access memory (RAM) unit. However, it would require a 2^16 word RAM (if the longest length of a codeword is 16 bits) which would be very wasteful. It is much more efficient to use a content addressable memory (CAM) whose sizes are determined only by the number of codebook entries. However, if it were implemented by CAM, it would result in a circuit much larger and complicated than a circuit using only a small RAM. Thus there is a need for a simple and flexible variable-length decoder that can speedily and efficiently decode variable length codes of varying standards.

Further limitations and disadvantages of conventional and traditional approaches will become apparent to one of skill in the art through comparison of such systems with the present invention, as set forth in the remainder of the present application with reference to the drawings.

SUMMARY OF THE INVENTION

One aspect of the present invention is directed to a data decoding system having a variable-length decoder (VLD) and an external memory unit. The variable-length decoder includes an address generator and a local memory unit. The address generator receives data from the data stream and generates a memory address at which to search for a codeword match in a VLD look-up table. The local memory unit stores at least a portion of the VLD look-up table. The external memory unit is external to the variable-length decoder and stores a portion of the VLD look-up table if the VLD look-up table does not fit entirely within the local memory unit.

Another aspect of the present invention is directed to a method of decoding a variable-length code data stream. Pursuant to the method, a base memory address is set equal to a start address. Then the next n bits in the data stream are retrieved. A memory location having an address equal to the sum of the base address, plus the value of the n retrieved bits, is accessed. The memory location includes status data indicating whether a codeword from the data stream is matched with its corresponding information. Each memory location that represents a codeword match includes the corresponding information. Each memory location that does not include a codeword match includes an offset value. If a codeword is matched with its corresponding information, the corresponding information is output, the base address is set equal to the start address, and the data in the data stream is shifted by a number of the retrieved bits that correspond to the outputted information. If a codeword is not matched with its corresponding information, the base address is set according to the offset value, and the data in the data stream is shifted n bits. This process, beginning with the retrieval of the next n bits in the data stream, is iteratively repeated.

Another aspect of the present invention is directed to another method of decoding a variable-length code data stream. Pursuant to this method, a first memory element is designated a memory element to be searched. Then the next n bits in the data stream are retrieved. A designated memory location in the memory element to be searched is accessed. The memory location includes status data indicating whether a codeword from the data stream is matched with its corresponding information. Each memory location that represents a codeword match includes the corresponding information. Each memory location that does not include a codeword match includes a next-search-location indicator indicating a memory element at which to perform the next search. If a codeword is matched with its corresponding information, the corresponding information is output, the first memory element is designated the memory element to be searched, and the data in the data stream is shifted by a number of the retrieved bits that correspond to the outputted information. If a codeword is not matched with its corresponding information, the memory element indicated by the next-search indicator is designated the memory element to be searched, and the data in the data stream is shifted n bits. This process, beginning with the retrieval of the next n bits in the data stream, is iteratively repeated.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 4 is a table demonstrating the operation of a stream funnel according to an illustrative embodiment of the present invention.

FIG. 6 is an example of a code table according to the code table storage algorithm of the present invention.

DETAILED DESCRIPTION

Figure 1:
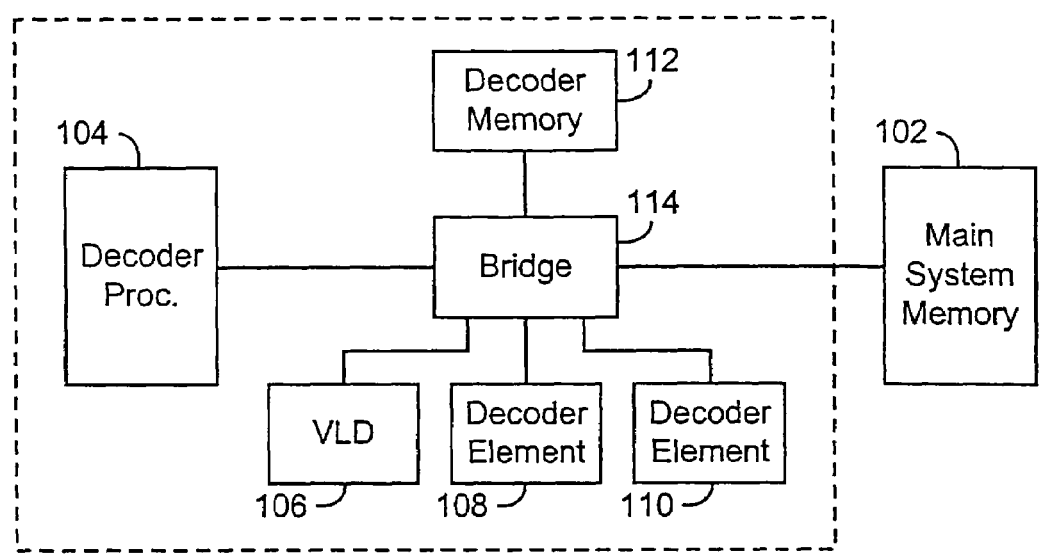
FIG. 1 is a functional block diagram of a decoding system according to an illustrative embodiment of the present invention.

FIG. 1 is a functional block diagram of a decoding system 100, according to an illustrative embodiment of the present invention. Decoding system 100 is illustratively part of a larger system, for which main memory unit 102 serves as the main system memory. Decoding system 100 includes decoder processor 104, variable-length decoder (VLD) 106, decoder element 108, decoder element 110, decoder memory 112, and bridge module 114. Decoder system 100 can have any number of decoder elements in addition to decoder elements 108 and 110. The decoder elements, such as decoder elements 108 and 110, can provide any of a multitude of decoding functions, such as inverse quantization and transform operations, and such as inverse discrete cosine transform (IDCT) operations, for example. Decoder processor 104 performs decoding functions and controls, coordinates and monitors other decoding modules, such as VLD 106 and decoder elements 108 and 110. VLD 106 performs variable-length decoding operations on an incoming data stream. Decoder memory 112 is used to store data that is being decoded during various stages of the decoding process. In an illustrative embodiment, decoder memory 112 also stores look-up tables that are used by VLD 106 in performing variable-length decoding, as will be described in more detail below. Bridge module 114 provides an interface between system memory 102 and decoder memory 112, as well as between the various modules within the decoding system 100. In an illustrative embodiment of the present invention, the decoding system 100 is a video decoding system. In such an embodiment, the decoder elements, such as decoder elements 108 and 110, can perform functions, such as pixel filtering, motion compensation, and de-blocking operations.

Variable-length decoder 106 is a hardware accelerator that accelerates the process of decoding variable-length codes, which might otherwise be a bottleneck for a decoding process if it were handled by the core processor 104 alone. The VLD 106 performs decoding of variable length codes (VLC) in the compressed bit stream to extract coefficients, such as DCT coefficients, from the compressed data stream. Different coding formats generally have their own special VLC tables. According to the present invention, the VLD module 106 is internally programmable to allow changes according to various processing algorithms. The VLD 106 is completely configurable in terms of the VLC tables it can process. The VLD 106 can accommodate different VLC tables on a macroblock-to-macroblock basis. In an illustrative embodiment of the present invention, the PVLD 106 includes a register that the core processor can program to guide the PVLD 106 to search for the VLC table of the appropriate encoding/decoding algorithm.

The VLD 106 is designed to support the worst-case requirement for VLD operation, such as with MPEG-2 HDTV (MP@HL) for video decoding, while retaining its full programmability. The VLD 106 includes a code table random access memory (RAM) for fastest performance. Some compression/decompression formats, such as Windows Media Technology 8 (WMT8) video, may require larger code tables that do not fit entirely within the code RAM in the VLD 106. For such cases, according to an illustrative embodiment of the present invention, the VLD 106 can make use of both the decoder memory 112 and the main memory 102, as needed. Performance of VLC decoding is reduced somewhat when codes are searched in video memory 112 and main memory 102. Therefore, for formats that require large amounts of code, the most common codes are stored in the VLD code RAM, the next most common codes are stored in decoder memory 112, and the least common codes are stored in main memory 102. Also, such codes are stored in decoder memory 112 and main memory such that, even when extended look-ups in decoder memory 112 and main memory are required, the most commonly occurring codes are found more quickly. This allows the overall performance to remain exceptionally high. The VLD 106 decodes variable length codes in as little as one clock, depending on the specific code table in use and the specific code being decoded.

In an illustrative embodiment of the present invention, the VLD 106 helps the core processor 104 to decode header information in the compressed bitstream. In an illustrative embodiment of the present invention, the VLD module 106 is architected as a coprocessor to the decoder processor 102. That is, it can operate on a single-command basis where the core processor issues a command (via a coprocessor instruction) and waits (via a Move From Coprocessor instruction) until it is executed by the VLD 106, without polling to determine completion of the command. This increases performance when a large number of VLC codes that are not DCT coefficients are parsed.

In an alternative embodiment, the VLD 106 is architected as a hardware accelerator. In this embodiment, the VLD 106 includes a status register that indicates whether the module is active or inactive. The core processor 104 polls the status register to determine whether the VLD 106 has completed its tasks. In an alternative embodiment, the VLD 106 shares a status register with other decoding elements, such as decoding elements 108 and 110.

In an illustrative embodiment of the present invention, the VLD module 106 includes two variable-length decoders. Each of the two variable-length decoders can be hardwired to efficiently perform decoding according to a particular compression standard, such as MPEG2 HD for video. In an illustrative embodiment, one or both of two VLDs can be optionally set as a programmable VLD engine, with a code RAM to hold VLC tables for other media coding formats. The two VLD engines are controlled independently by the core processor 104, and either one or both of them will be employed at any given time, depending on the application.

The VLD 106 can operate on a block-command basis where the core processor 104 commands the VLD 106 to decode a complete block of VLC codes, such as DCT coefficients, and the core processor 104 continues to perform other tasks in parallel. In this case, the core processor 104 verifies the completion of the block operation by checking a status bit in the VLD 106. The PVLD produces results (tokens) that are stored in decoder memory 112.

The VLD 106 checks for invalid codes and recovers gracefully from them. Invalid codes may occur in the coded bit stream for a variety of reasons, including errors in the video encoding, errors in transmission, and discontinuities in the stream.

Figure 2:
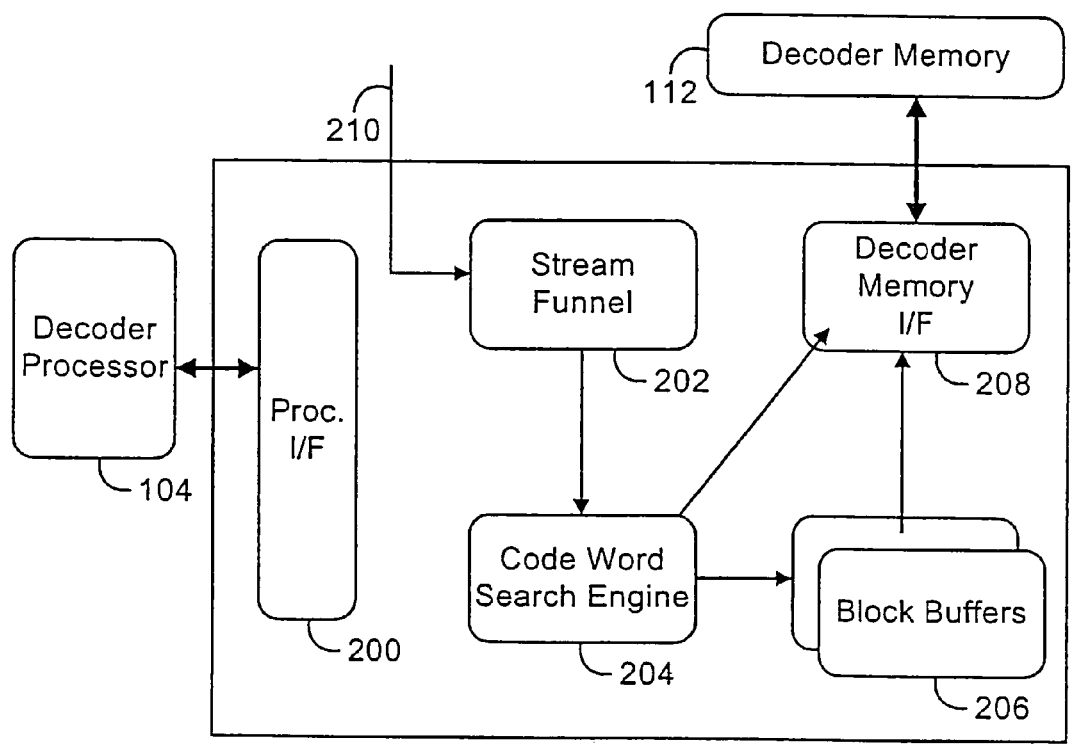
FIG. 2 is a functional block diagram representing a variable-length decoding system according to an illustrative embodiment of the present invention.

FIG. 2 is a functional block diagram representing a variable-length decoding system, according to an illustrative embodiment of the present invention. In FIG. 2, elements that are also shown in FIG. 1 are given like reference numbers. The VLD 106 includes decoder processor interface 200, stream funnel 202, codeword search engine 204, block buffer 206 and decoder memory interface 208.

The input 210 to the VLD 106 is a bit stream without explicit word-boundaries. The VLD 106 decodes a codeword, determines its length, and shifts the input data stream by the number of bits corresponding to the decoded code length, before decoding the next codeword. These are recursive operations that cannot be pipelined.

The VLD is implemented based on a small RAM, located in codeword search engine 204, which stores programmable Huffman coded tables. A small RAM is achieved by employing a new multistage search structure that reduces the storage requirement, enables for fast bit extraction and efficiently handles the case of a large number of code tables.

The stream funnel 202 receives data from the source (or coded buffer) and shifts the data, according to the previously-decoded code length, so as to output the correct window of bits for the symbols that are being currently decoded. In an illustrative embodiment, the stream funnel receives the incoming bitstream 210 from system memory 102.

The codeword search engine 204 mainly behaves as a symbol search engine. The codeword search engine is based on a multistage search structure. Since codewords are assigned based on the probability of appearance, the shortest codeword is assigned to the most frequent appearance. The multistage search structure is based on this concept. The codeword search engine 204 incorporates several innovations that allow fast bit extraction and reduce the sizes of code tables. For hardware architecture, a small RAM is employed for performing pattern-matching. A multistage pipelined structure is employed to handle the case of a long codeword. Additionally, the code table reduction algorithm can further reduce the storage requirement for a large number of code tables.

Figure 3:
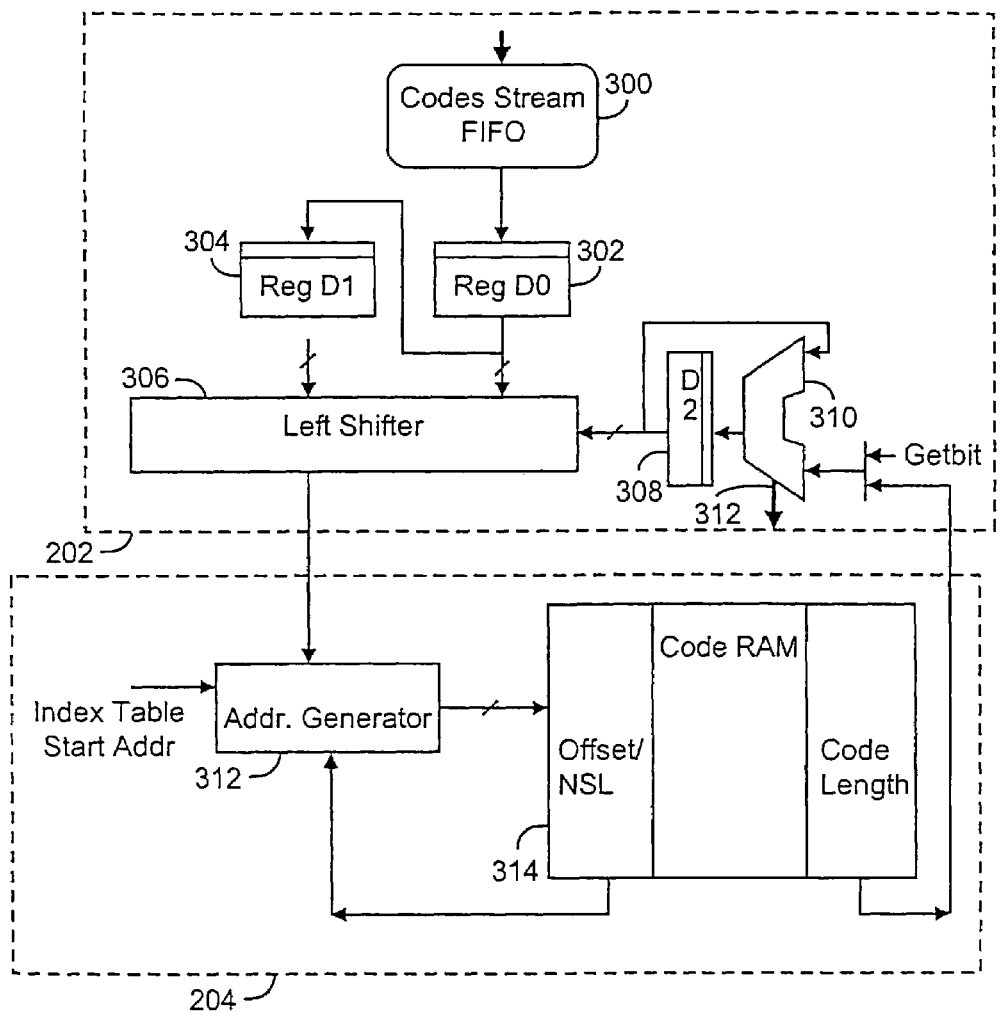
FIG. 3 is a block diagram showing stream funnel and codeword search engine elements of a variable-length decoder according to an illustrative embodiment of the present invention.

FIG. 3 is a block diagram showing the stream funnel 202 and codeword search engine 204 elements of VLD 106 according to an illustrative embodiment of the present invention.

Stream funnel 202 includes data stream input buffer 300, register $D_0$ 302, register $D_1$ 304, left-shifter 306, register $D_2$ 308, and accumulator 310. The input data (coded stream) are stored in input buffer 300, which, in an illustrative embodiment, is a first-in first-out (FIFO) buffer. The input buffer 300 provides the data to register $D_0$ 302. Register $D_1$ 304 also stores part of the incoming bitstream by virtue of load operations that will be discussed below and which load data from register $D_0$ 302 into register $D_1$. The contents of registers $D_0$ and $D_1$ are in turn provided to left shifter 306. In an illustrative embodiment of the present invention, registers $D_0$ and $D_1$ comprise a number of bits equal to the maximum code length. In an embodiment wherein the maximum code length is 32 bits (such as in most video decoding standards), registers $D_0$ 302 and $D_1$ 304 each are 32-bit registers, and left-shifter 306 can hold up to 64 bits.

When the codeword search engine 204 completes a search for a given string of code, that is, when the codeword search engine finds a codeword match, the codeword search engine 204 notifies accumulator 310 of the number of bits of the incoming bitstream (stored in registers $D_0$ and $D_1$) for which it just found a codeword match. That is, the codeword search engine 204 provides the accumulator 310 with the length of the codeword that it just decoded.

Accumulator 310 accumulates the number of bits in register $D_1$ 304 that have been decoded by codeword search engine 204 over multiple codeword matches and stores the accumulated total in register $D_2$. If registers $D_0$ and $D_1$ each hold 32 bits, the number of bits indicated by register $D_2$ can lie between 0 and 31. This number controls the left shifter 306. Left shifter 306 shifts the indicated number of bits to the left so that the first un-decoded bit appears at the most significant bit of the output of the left shifter 306. When the accumulated code length (the number of bits that have been decoded) is greater than or equal to the size of register $D_1$ 304 (for example, 32 bits), a carry-out bit 312 becomes 1. This indicates that all the bits in register $D_1$ 304 have been used and that register $D_0$ might not contain the whole next codeword. In that case, a "load" signal is generated. When the "load" signal is generated, the contents of register $D_0$ 302 are loaded into register $D_1$ 304, a new data word (32 bits in the illustrative example) from the input buffer 300 is loaded into $D_0$, and the left shifter 306 shifts by the number of bits indicated by register $D_2$ 308 to the new position, all at substantially the same time, to prepare for the next search/decode cycle. If the accumulated code length is not greater than or equal to the size of register $D_1$ 304 (e.g., 32), the carry-out signal 312 is 0. Assuming the maximum code length is 32 bits (the size of registers $D_0$ 302 and $D_1$ 304 in the illustrative embodiment), since at least 32 bits of data in registers $D_0$ 302 and $D_1$ 304 are not used yet, there are always enough bits for the next search/decoding cycle. Registers $D_0$ 302 and $D_1$ 304 remain unchanged if the accumulated code length is not greater than or equal to the size of the registers $D_0$ 302 and $D_1$ 304.

When the accumulated code length is greater than or equal to the size of registers $D_0$ and $D_1$, and there is no data available in the input buffer 300, the decoding pipes are put on hold. In other words, the contents of register $D_0$ 302 are not loaded into register $D_1$ 304. The decoding processing then waits until data is available in the input buffer 300.

FIG. 4 is a table demonstrating the operation of the stream funnel 202. The following codebook (Table 1) is used in the example of FIG. 4:

TABLE 1

| Codeword | Code Length | Decoded Symbol |
|---|---|---|
| 1 | 1 | A |
| 010 | 3 | B |
| 011 | 3 | C |
| 0010 | 4 | D |
| 0011 | 4 | E |
| 00010 | 5 | F |
| 00011 | 5 | G |
| 0000110 | 7 | H |
| 00001010 | 8 | I |

In the example of FIG. 4, registers $D_0$ and $D_1$ are 32-bit registers. FIG. 4 shows, for each of a plurality of search/decode stages, the contents of registers $D_0$ 302 and $D_1$ 304, the number of bits (code length) in the decoded string of input data decoded in the indicated stage, the output of the accumulator 310 (and thus the contents of register $D_2$) at the end of each stage, and a symbol decoded in the stage. Also, the data in registers $D_0$ and $D_1$ that constitute the most significant bits of left shifter 306 are shown in bold. The non-bold data constitute data that were searched/decoded in a previous stage and was thus shifted out by the left shifter after that stage. At the beginning of stage 1, the contents of register $D_2$ 308 is 0, and the contents of the left shifter 306 include all of the data in registers $D_0$ 302 and $D_1$ 304.

In stage 1, the symbol "I" is decoded, which corresponds to the input stream 00001010. Because eight data bits (00001010) were searched/decoded in stage 1, the accumulated number of decoded bits (the cumulative number of bits in register $D_1$ that have been searched and decoded) is eight. Thus register $D_2$ 308 indicates that the input data is to be left-shifted 8 bits prior to performing the stage 2 search. The left shifter 306 thus shifts the data 8 bits as indicated by register $D_2$ 308. Thus the bit at the most-significant position in the left-shifter 306 at the beginning of stage 2 is the ninth bit of register $D_1$.

In stage 2, the symbol H is decoded, which corresponds to the bitstream 0000110. Because seven data bits (0000110) were searched/decoded in stage 2, the accumulated number of decoded bits is 15 (8 (from stage 1)+7 (from stage 2)). Thus register $D_2$ 308 indicates that the input data is to be left-shifted 15 bits prior to performing the stage 3 search. The left shifter 306 thus shifts the data 15 bits as indicated by register $D_2$ 308. Thus the bit at the most-significant position in the left-shifter 306 at the beginning of stage 3 is the $16^{th}$ bit of register $D_1$.

Stage 3 of the process proceeds in a similar manner, with the symbol F being decoded, which corresponds to the bitstream 00010.

In stage 4, the symbol G is decoded, which corresponds to the bitstream 00011. Because five data bits (00011) were searched/decoded in stage 4, the accumulated number of decoded bits is 25 (8 (from stage 1)+7 (from stage 2)+5 (from stage 3)+5 (from stage 4)). Thus register $D_2$ 308 indicates that the input data is to be left-shifted 25 bits prior to performing the stage 5 search. The left shifter 306 thus shifts the data 25 bits as indicated by register $D_2$ 308. Thus the bit at the most-significant position in the left-shifter 306 at the beginning of stage 2 is the $26^{th}$ bit of register $D_1$.

In stage 5, the symbol I is decoded, which corresponds to the bitstream 00001010. Because eight data bits (00001010) were searched/decoded in stage 5, the accumulated code length is 33 (8 (from stage 1)+7 (from stage 2)+5 (from stage 3)+5 (from stage 4)+8(from stage 5)), which is greater than the size of registers $D_0$ and $D_1$. Therefore, the carry-out bit 312 is set. This indicates that all the bits in register $D_1$ 304 have been used, and that register $D_0$ might not contain the whole next codeword. Therefore, the "load" signal is generated. Thus, for stage 6, the contents of register $D_0$ 302 are loaded into register $D_1$ 304, a new data word (32 bits in the illustrative example) from the input buffer 300 is loaded into $D_0$, and the left shifter 306 shifts by the number of bits (one) indicated by register $D_2$ 308 to the new position, all at substantially the same time, to prepare for the stage 6 search/decode. Thus, the bit at the most-significant position in the left-shifter 306 in stage 6 is the second bit of register $D_1$, which now holds the data that was previously in register $D_0$ 302.

In stage 6, the symbol B is decoded, which corresponds to the codeword 010. Because three data bits (010) were searched/decoded in stage 6, the accumulated number of decoded bits (the cumulative number of bits in register $D_1$ that have been searched and decoded) is 4 (1 (from stage 5)+3 (from stage 6)). Thus register $D_2$ 308 indicates that the input data is to be left-shifted 4 bits prior to performing the stage 7 search. The left shifter 306 thus shifts the data 4 bits as indicated by register $D_2$ 308. Thus the bit at the most-significant position in the left-shifter 306 at the beginning of stage 7 is the $4^{th}$ bit of register $D_1$.

Stage 7, and any subsequent stages, proceed in a similar manner.

Referring again to FIG. 3, codeword search engine 204 includes an address generator 312 and a local memory unit 314. Address generator 312 generates a memory address at which to perform a codeword search. In an illustrative embodiment, this address will reside in the local memory unit 314, but it may also reside in decoder memory 112 or system memory 102, as will be described below. The address generator 312 generates the address to be searched by adding the value of the bits retrieved from left shifter 306, i.e., the data for which a search is to be performed, to a base address. For the first search performed in a given code table, and for subsequent searches when the previous search yielded a code match, the base address is equal to the start address of the code table to be searched. For subsequent searches performed after a previous search did not yield a code match, the base address is equal to the sum of the start address of the code table plus an offset that was indicated by the code table entry of the previous search.

In an illustrative embodiment of the present invention, the starting address of the code table to be searched can be programmed. In this way, the appropriate code table can be selected for the encoding/decoding format of the bitstream being decoded. In an illustrative embodiment of the present invention, the VLD 106 includes a register that holds the starting address of the code table to be searched. This register can be accessed by the decoder processor 104 to point to the code table that is appropriate for the current data stream. In an embodiment wherein the incoming data stream comprises video data, the code tables can be switched on a macroblock-to-macroblock basis.

Local memory 314 holds the code look-up table that is to be used during the variable-length decoding process. The code table that starts at the indicated start address is used in decoding the incoming bitstream. In an illustrative embodiment of the present invention, local memory 314 is a random access memory (RAM) unit. In a further illustrative embodiment, the local memory is a relatively small memory unit, for example, a 512×32 single-port RAM.

In an illustrative embodiment of the present invention, if a given code look-up table does not fit within the local memory unit 314, portions of the table can be stored in decoder memory 112 and/or system memory 102. In an illustrative embodiment, if more memory is needed than the local memory unit 314 alone, first the decoder memory 112 is utilized, and if more still is needed, the system memory 102 is utilized. Where multiple memory units are utilized, the shortest, and therefore most common codes are stored in local memory 314. The next-shortest codes are stored in decoder memory 112, and if needed, the longest codes are stored in system memory 102. This architecture allows for fast bit extraction.

One embodiment of the present invention is directed to a code table storage and look-up method that enables fast bit extraction and also reduces the size of the code tables. Reducing the size of the code tables further reduces the storage requirement for a large number of code tables. One embodiment of the code table storage and look-up method makes use of the multiple memory unit structure mentioned above and uses a multistage, pipelined structure to handle the case of a long codeword.

The local memory unit 314 supports multiple code tables (up to 32 in an illustrative embodiment). Each code table has the following general information which are pre-programmed by the decoder processor 104: the starting address in the local memory 314 of the code table during the first search (FSA), the searching length during the first level search (FSL), a signed bit indicator, and the size of the fixed run-length code. A high signed bit indicator indicates that the code table has a signed bit following the codeword. The size of the fixed run-length code comprises three components: a level value, a run value and last-bit indicator. The level value represents the number of bits that are used for representing the level in run-length coding. The run value represents the number of bits that are used for representing the run in run-length coding. The last-bit indicator is high when there is a "last" bit that appears in the run-length code. For example, in MPEG4 video, if the escape code is type4, the 15 bits following ESC are decoded as fixed length codes represented by 1-bit LAST, 6-bit RUN and 8-bit LEVEL.

Each address of a code table comprises a code table entry. Each entry includes a current code length (CCL) indicator, an end-of-block bit, a status indicator and an information/offset value. The status indicator indicates whether that entry represents a codeword match. If the entry does represent a codeword match, the information/offset value is the matching information, that is, the data that the just-matched codeword represents (the "meaning" of the codeword). If the entry does not represent a codeword match, the information/offset value indicates an address at which to perform the next codeword search. In an illustrative embodiment of the present invention, the offset value indicates an address at which to base the next codeword search. In an alternative embodiment, the offset value is added to another address to obtain the base address from which to perform the next search.

The status indicator can also indicate other aspects of the search status. For example, if the entry does not represent a codeword match, the status indicator indicates the memory unit in which to perform the next codeword search. Also, if the entry represents an error, i.e., no valid code would result in the entry at that memory location to be reached—the status indicator indicates as much. In an illustrative embodiment of the present invention, the status indicator is a 4-bit word having the meanings shown in Table 2.

TABLE 2

| Status Code [3:0] | Meaning |
|---|---|
| 0001 | Escape code followed by run length code |
| 0010 | Special Codeword 1 |
| 0011 | Special Codeword 2 |
| 0100 | CodeWord Found |
| 0101 | Goto Next Level Code Search @ Code RAM |
| 0110 | Goto Next Level Code Search @ Decoder Memory |
| 0111 | Error has been detected |
| 1000 | Goto Next Level Code Search @ System Memory |
| others | reserved |

As mentioned above, if the code table entry represents a codeword match (status=0100), the information/offset value represents the meaning of the codeword. If the code table entry does not represent a codeword match and the next search is to be performed in local memory (status=0101), the information/offset value represents the start address of the next search level at local memory 314 (code RAM). If the code table entry does not represent a codeword match, and the next search is to be performed in decoder memory (status=0110), the information/offset value represents the offset of the secondary code table at the decoder memory 112. If the entry does not represent a codeword match and the next search is to be performed in system memory (status=1000), the information/offset value represents the offset of the tertiary code table at the system memory 102.

The current code-length indicator indicates the number of bits that the input bitstream should be shifted prior to the next codeword search. If the code table entry represents a codeword match, the current code-length represents the number of bits, out of the currently searched group of bits, that correspond to the matched information represented by the information/offset value. If the code table entry does not represent a codeword match, the current code-length indicator indicates the number of bits for which a codeword search is to be performed in the next stage. If the entry represents an error, the current code-length indicator indicates that no bits in the current search have been matched.

Each code table entry that does not represent a codeword match further includes a next-search-length (NSL) indicator that indicates the number of bits to perform a codeword search for in the next stage. In an illustrative embodiment, the code table entries that do represent a codeword match do not contain a next-search-length indicator, as the search length in the next stage automatically reverts to an initial value. In an alternative embodiment, the code table entries that do represent a codeword match do contain a next-search-length indicator, which indicates the initial value.

The end-of-block bit is high if the just-decoded code is the last code in a block of codes to be decoded.

The local memory 314 and the address generator 312 work together to perform a pattern matching on the data stream. When a codeword is matched at a code table entry, the status indicator in the entry will indicate that is the case. If an accessed code table entry is not a match, the state machine will go to the next stage to keep searching until the codeword is found. If the status indicator shows that an error has occurred, the PVLD will stop searching the next codeword, set an error status bit to "1," report the error to the decoder processor 104 and enter an idle state.

Figure 5:
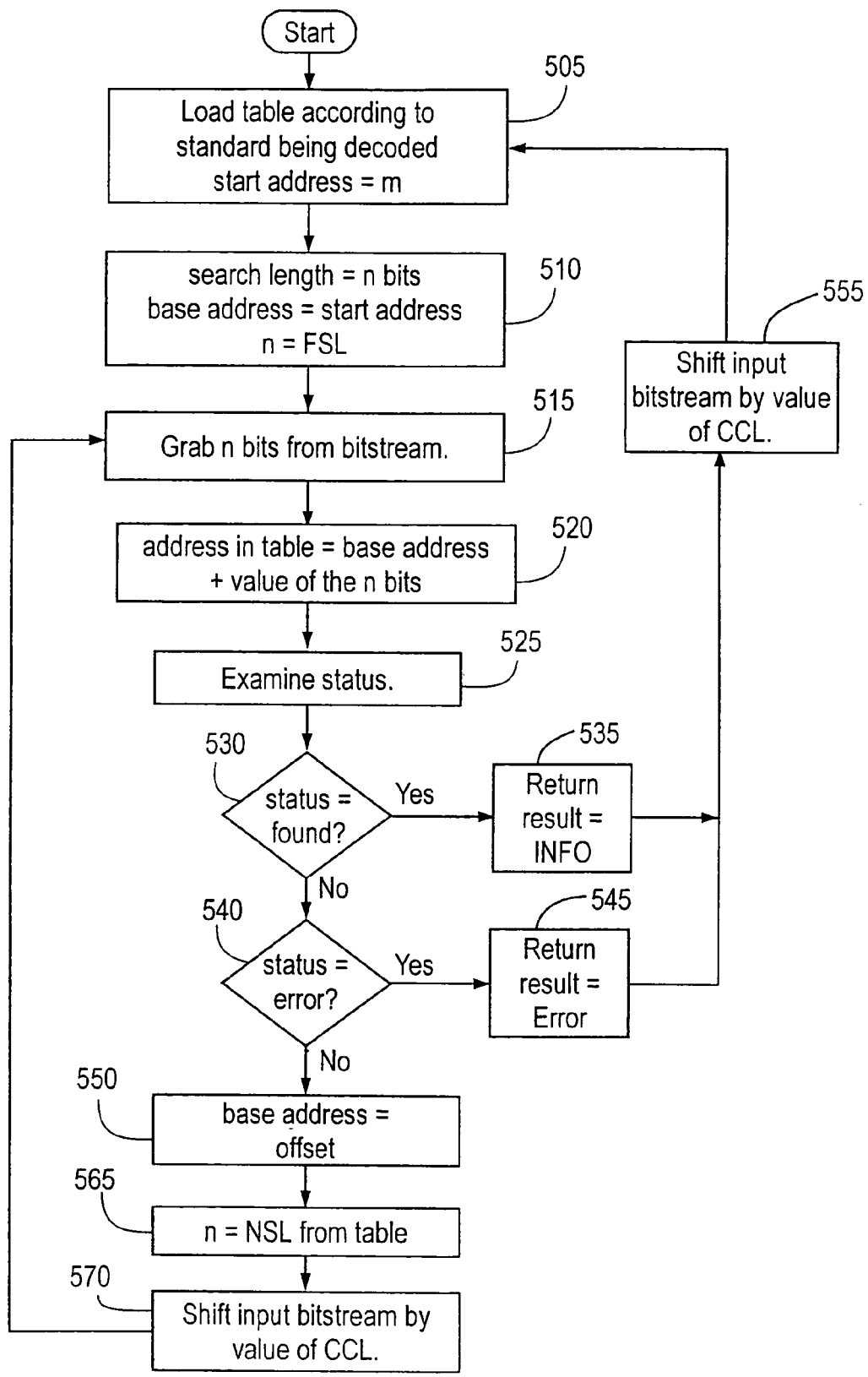
FIG. 5 is a flowchart representing a method of decoding a variable-length code data stream according to an illustrative embodiment of the present invention.

FIG. 5 is a flowchart representing a method of decoding a variable-length code data stream, according to an illustrative embodiment of the present invention. The method implements a code table storage algorithm, and a method of traversing a code table implementing the algorithm, that reduces the storage requirement and enables fast code lookup. At step 505, the appropriate code table is loaded according to the compression/decompression standard of the data stream being decoded. The code table is illustratively loaded into local memory 314. The start address of the code table in the local memory is designated m. At step 510, a base memory address is set equal to the start address. Also, at step 510, the search length, n, i.e., the number of bits from the data stream for which a code match is sought in a given search, is initialized as a first search length (FSL) value.

At step 515, the next n bits in the data stream are retrieved. In an illustrative embodiment, these bits are retrieved from the n most significant bits of left shifter 306. At step 520, the address at which to search for a code match is generated by adding the value of the n bits retrieved from the bitstream to the base address. This step is illustratively performed by address generator 312. At step 525, the memory location having the address generated in step 520 is accessed and the status indicator at that memory location is examined. Decision box 530 asks whether the status indicator indicates that a codeword match is found. If the answer is yes, the corresponding information, indicated by the information/offset value of the memory location, is output, as shown at step 535.

If the status indicator indicates that a codeword match is not found, decision box 540 asks whether the status indicator indicates that an error has occurred. Such an error would arise, for example, if the memory location arrived at does not correspond to a valid code. If there is an error, an error indication is given, as indicated at step 545. If the status indicator indicates that either a codeword match is found or an error has occurred, the incoming bitstream is shifted by an amount indicated by the current code-length indicator of the memory location, as indicated by step 555. Control then passes to step 505, where the appropriate code table for the next set of bits to be decoded is loaded according to the compression/decompression standard of the data stream being decoded. If the status indicator indicates that the memory location does not represent a codeword match, and an error has not occurred, the base address is set according to the offset value indicated by the information/offset value, as indicated at step 550, and the search length, n, is set equal to the next-search-length value held in the memory location, as shown at step 565. In an illustrative embodiment, the search length remains constant throughout the decoding process. In that case, step 565 of FIG. 5 can be eliminated.

At step 570, the incoming bitstream is shifted by an amount indicated by the current code-length indicator of the memory location. Step 570 is illustratively performed by left shifter 306. In an illustrative embodiment, if the memory location represents a codeword match, the current code-length indicator indicates the number of the retrieved bits that correspond to the outputted information (the meaning of the codeword). In a further illustrative embodiment, if the memory location represents a non-match, the value of the current code-length indicator is equal to n bits (the number of bits for which the current search was performed). In another embodiment, if the status indicator indicates an error, the value of the current code-length indicator is zero. After step 570, the next n bits in the data stream are accessed, as indicated by step 515, and the above-described process is repeated starting at that point. In an exemplary embodiment, this process is iteratively repeated as long as there is data in the data stream to decode.

FIG. 6 is an example of a code table according to the code table storage algorithm of the present invention. In an illustrative embodiment of the present invention, the code table of FIG. 6 is stored in local memory 314. The following codebook (Table 3) is used in the exemplary code table of FIG. 6:

TABLE 3

| Codeword | Code Length | Decoded Symbol |
|---|---|---|
| 1 | 1 | A |
| 010 | 3 | B |
| 011 | 3 | C |
| . | | |
| . | | |
| . | | |
| 00010 | 5 | X |
| 000110 | 6 | Y |
| 000111 | 6 | Z |

Each of the addresses 600 in the code table of FIG. 6 represents a codebook entry. The other columns 610, 620, 630, 640 and 650 represent elements of each codebook entry. These elements include current code-length indicator 610, next-search-length indicator 620, end-of-block bit 630, status indicator 640 and information/offset value 650. The illustrative code table of FIG. 6 has a first search length (FSL) of 3 and a starting address (FSA) of 0.

To demonstrate how the code table of FIG. 6 is structured and to demonstrate how it is traversed in order to decode a variable-length bitstream, assume the bits in the most-significant position of left shifter 306 are the bits 1010 (which we know, from referring to the codebook of Table 3, represent symbols A and B). The codeword search engine decodes these bits as follows. Because the first search length is 3, the first three bits of the data stream (101) are pulled from the data stream, that is, from the left shifter 306. The address generator 312 adds the value of these bits (5) to the starting address (0) to get a search address of 5. The code table entry at address 5 has a status indicator=0100, which indicates that the entry represents a codeword match (see table 2). Therefore, the information/offset value (A) of the entry is outputted as a decoded value. In an illustrative embodiment of the present invention, this output value is provided to decoder memory 112 and stored there. The current-code-length indicator of the entry at address 5 is a 1. This value is provided to accumulator 310, indicating that one bit (the first 1, corresponding to the outputted A) was decoded in this stage. Because this is the first decoding stage, the cumulative code length (the number of bits in register $D_1$ that have been searched and/or decoded) is 1. This value is stored in register $D_2$, indicating that the left shifter 306 should shift its contents four bits prior to the next codeword search.

Therefore, in the next stage, prior to performing the next search, the left shifter 306 shifts its contents one bit, putting the bits 010 at the three most-significant positions of left shifter 306. The search length is three (the first search length) because the previous search resulted in a codeword match. Thus, the bits 010 are provided to the address generator 312, which adds the value of these bits (2) to the starting address (0) to get a search address of 2 (the starting address is used as the base address because the previous search yielded a match). The code table entry at address 2 has a status indicator=0100, which indicates that the entry represents a codeword match. Therefore the information/offset value (B) is outputted as a decoded value. Hence, the input string 1010 has been decoded as AB. The current-code-length indicator of the entry at address 2 is a 3. This value is provided to accumulator 310, indicating that three bits (010, corresponding to the outputted B) were decoded in this stage. The cumulative code length (the number of bits in register $D_1$ that have been searched and/or decoded) is 4 (1 (from the first stage)+3 (from the present stage)). This value is stored in register $D_2$, indicating that the left shifter 306 should shift its contents four bits prior to the next codeword search.

Say, for example, the next bits in the data stream (after the bits 1010) are 00010010 (which represent symbols X and B). Because the value stored in register $D_2$ from the previous search is 4, prior to performing the next search, the left shifter 306 shifts its contents four bits, putting the bits 000 at the three most-significant positions of left shifter 306. The search length is three (the first search length) because the previous search resulted in a codeword match. Thus, the bits 000 are provided to the address generator 312, which adds the value of these bits (0) to the starting address (0) to get a search address of 0 (the starting address is used as the base address because the previous search yielded a match). The code table entry at address 0 has a status indicator=0101, which indicates that the entry does not represent a codeword match. Therefore, the information/offset value (8) is provided to address generator 312 to be used in calculating the base address of the next search. The code table entry at address 0 has a next search-length indicator of 3. This value is provided to address generator 312 to indicate the number of bits to be retrieved from the left shifter 306 for the next search. The current-code-length indicator of the entry at address 0 is a 3. This value is provided to accumulator 310, indicating that three bits (000) were searched in this stage. The accumulated code length (the number of bits in register $D_1$ that have been searched and/or decoded) is 7 (1 (from the first stage)+3 (from the second stage)+3 (from the present stage)). This value is stored in register $D_2$, indicating that the left shifter 306 should shift its contents seven bits prior to the next codeword search.

Shifting the contents of left shifter 306 by the indicated seven bits puts the bits 100 at the three most-significant positions of left shifter 306. The search length is three, as indicated to the address generator 312 by the next-search-length indicator from the previous stage. Thus, the bits 100 are provided to the address generator 312, which adds the value of these bits (4) to the base address to get the search address. The base address is equal to the start address (0) plus the offset value (8) indicated by the information/offset value from the previous stage. Thus the search address=0+8+4=12. The code table entry at address 12 has a status indicator=0100, which indicates that the entry represents a codeword match. Therefore the information/offset value (X) is outputted as a decoded value. The current-code-length indicator of the entry at address 12 is a 2. This value is provided to accumulator 310, indicating that two bits (10, which are the first two bits of the just-searched bits, and which are also the last two bits of the just-decoded codeword) were decoded in this stage. The accumulated code length (the number of bits in register $D_1$ that have been searched and/or decoded) is 9 (1 (from the first stage)+3 (from the second stage)+3 (from the third stage)+2 (from the present stage). This value is stored in register $D_2$, indicating that the left shifter 306 should shift its contents nine bits prior to the next codeword search.

Therefore, in the next stage, prior to performing the next search, the left shifter 306 shifts its contents nine bits, putting the bits 010 at the three most-significant positions of left shifter 306. The search length is three (the first search length) because the previous search resulted in a codeword match. Thus, the bits 010 are provided to the address generator 312, which adds the value of these bits (2) to the starting address (0) to get a search address of 2 (the starting address is used as the base address because the previous search yielded a match). The symbol B is decoded at the code table entry at address 2, as was described above.

In an illustrative embodiment of the present invention, multiple memory units are used to store the codeword look-up table. For example, in one embodiment, part of the codeword look-up table is stored in local memory 314, part is stored in decoder memory 112, and part is stored in system memory 102. The shortest, and therefore most common codes, are stored in local memory 314, enabling the majority of codeword searches to be performed quickly and efficiently. The next shortest codes are stored in decoder memory 112, and the longest codes are stored in system memory. In this embodiment, the status indicator of each code table entry indicates the memory unit at which to perform the next search if the current search did not result in a codeword match. If the current search did produce a codeword match, the status indicator indicates that condition, and the next search will be performed in local memory unit 314. The first search for a data stream, and each search following a codeword match are performed in the local memory unit 314.

In the case of block decoding, the VLD 106 will continue decoding the bitstream as long as there is space available in the block buffer 206. In order to simplify the design, in an illustrative embodiment of the present invention, the VLD 106 checks the buffer availability before starting to decode a block. When the VLD 106 is finished decoding a block, the VLD 106 transfers the data to the block buffer 206. This processing continues until a block count is reached. In an illustrative embodiment wherein the VLD 106 is part of a video decoder, a double buffer scheme is used in order to support High Definition (HD) performance.

Although a preferred embodiment of the present invention has been described, it should not be construed to limit the scope of the appended claims. For example, the present invention is applicable to any type of data utilizing variable-length code, including any media data, such as audio data and graphics data, in addition to the video data illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of decoding a variable-length code data stream, comprising steps of:
   (a) setting a base memory address equal to a start address;
   (b) retrieving the next n bits in the data stream;
   (c) accessing a memory location having an address equal to the sum of the base address plus the value of the n retrieved bits, which memory location includes status data indicating whether a codeword is found, wherein, if a codeword is found, the memory location includes corresponding information, and wherein if a codeword is not found, the memory location includes an offset value;
   (d) if a codeword has been identified:
      (d)(i) outputting the decoded information corresponding to the codeword;
      (d)(ii) setting the base address equal to the start address; and
      (d)(iii) shifting the data in the data stream by a number of the retrieved bits that correspond to the decoded information; and
   (e) if a codeword has not been identified:
      (e)(i) setting the base address according to the offset value; and
      (e)(ii) shifting the data in the data stream n bits.

2. The method of claim 1 wherein the memory location includes current code-length data indicating the number of bits by which to shift the data in the data steam in shifting steps (d)(iii) and (e)(ii).

3. The method of claim 2 wherein, if a codeword has been identified, the current code-length data indicates the number of the retrieved bits that correspond to the decoded information.

4. The method of claim 2 wherein, if a codeword has not been identified, the current code-length data indicates the number, n, of bits retrieved in step (b).

5. The method of claim 1 wherein shifting steps (d)(iii) and (e)(ii) comprise left-shifting the data in the data stream.

6. The method of claim 1 wherein if a codeword has not been identified, the memory location includes next-search-length data indicating a number, n, of bits to be retrieved in the next stage and wherein step (e) further comprises a sub-step (e)(iii) of setting the number of bits, n, to be retrieved in the next stage equal to the value of the next-search-length data.

7. The method of claim 1 wherein the variable-length code data stream is a media data stream.

8. The method of claim 7 wherein the variable-length code data stream is a video data stream.

9. The method of claim 8 wherein if a codeword is identified, the memory location includes a discrete cosine transform coefficient corresponding to the found codeword.

10. The method of claim 1 wherein step (e)(i) comprises setting the base address equal to the offset value.

11. The method of claim 1 wherein step (e)(i) comprises setting the base address equal to the sum of the offset value plus the start address.

12. A method of decoding a variable-length code data stream, comprising steps of:
    (a) designating a first memory element as a memory element to be searched;
    (b) retrieving the next n bits in the data stream;
    (c) accessing a designated memory location in the memory element to be searched, which memory location includes status data indicating whether a codeword from the data stream has been identified, wherein if a codeword has been identified, the memory location includes decoded information corresponding to the identified codeword, and wherein if a codeword has not been identified, the memory location includes a next-search-location indicator indicating a memory element at which to perform the next search;
    (d) if a codeword has been identified:
       (d)(i) outputting the decoded information corresponding to the codeword;
       (d)(ii) designating the first memory element as the memory element to be searched; and
       (d)(iii) shifting the data in the data stream by a number of the retrieved bits that correspond to the decoded information; and
    (e) if a codeword has not been identified:
       (e)(i) designating the memory element indicated by the next-search indicator as the memory element to be searched; and
       (e)(ii) shifting the data in the data stream n bits.

13. The method of claim 12 wherein step (a) further comprises setting a base memory address equal to a start address, wherein the designated memory location of step (c) has an address equal to the sum of the base address plus the value of the n retrieved bits, wherein the memory location of step (c) includes an offset value, wherein step (d) further comprises a sub-step (d)(iv) of setting the base address equal to the start address, and wherein step (e) further comprises a sub-step (e)(iii) of setting the base address according to the offset value.

14. The method of claim 13 wherein step (e)(iii) comprises setting the base address equal to the offset value.

15. The method of claim 13 wherein step (e)(iii) comprises setting the base address equal to the sum of the offset value plus a starting address of the memory element indicated by the next-search-location indicator.

16. The method of claim 12 wherein the memory location includes current code-length data indicating the number of bits by which to shift the data in the data steam in shifting steps (d)(iii) and (e)(ii).

17. The method of claim 16 wherein, if a codeword is identified, the current code-length data indicates the number of the retrieved bits that correspond to the decoded information.

18. The method of claim 16 wherein, if a codeword is not identified, the current code-length data indicates the number, n, of bits retrieved in step (b).

19. The method of claim 12 wherein shifting steps (d)(iii) and (e)(ii) comprise left-shifting the data in the data stream.

20. The method of claim 12 wherein if a codeword is not identified, the memory location includes next-search-length data indicating a number, n, of bits to be retrieved in the next stage and wherein step (e) further comprises a sub-step (e)(iii) of setting the number of bits, n, to be retrieved in the next stage equal to the value of the next-search-length data.

21. The method of claim 12 wherein the variable-length code data stream is a media data stream.

22. The method of claim 21 wherein the variable-length code data stream is a video data stream.

23. The method of claim 22 wherein if a codeword has been identified, the memory location includes a discrete cosine transform coefficient corresponding to the identified codeword.

* * * * *